(12) United States Patent
Kurokawa et al.

(10) Patent No.: US 12,319,460 B2
(45) Date of Patent: Jun. 3, 2025

(54) BOX PACKING APPARATUS

(71) Applicant: ISHIDA CO., LTD., Kyoto (JP)

(72) Inventors: Masashi Kurokawa, Ritto (JP); Teruyuki Tada, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 18/490,765

(22) Filed: Oct. 20, 2023

(65) Prior Publication Data

US 2024/0140638 A1 May 2, 2024

(30) Foreign Application Priority Data

Nov. 2, 2022 (JP) ................................. 2022-176485

(51) Int. Cl.
*B65B 59/00* (2006.01)
*B65B 5/06* (2006.01)
(Continued)

(52) U.S. Cl.
CPC ............ *B65B 59/005* (2013.01); *B65B 5/061* (2013.01); *B65B 5/101* (2013.01); *B65B 35/10* (2013.01);
(Continued)

(58) Field of Classification Search
CPC ......... B65B 5/061; B65B 5/101; B65B 35/10; B65B 35/24; B65B 35/246; B65B 35/44; B65B 59/005; B65B 35/54
(Continued)

(56) References Cited

U.S. PATENT DOCUMENTS 5,123,231 A * 6/1992 Fallas et al. ............ B65B 5/101
53/538
5,768,856 A * 6/1998 Odenthal ................ B65B 5/061
53/448
(Continued)

FOREIGN PATENT DOCUMENTS

EP 0624516 A1 11/1994
EP 3371062 B1 9/2018
(Continued)

OTHER PUBLICATIONS

Bibliographic information for "Reverse Direction Conveyor With Accumulation Stop Bar;" Smartmove Conveyors; https://www.youtube.com/watch?v=LEWLhV224vk&ab_channel=SmartMoveConveyors ; Oct. 16, 2018.
(Continued)

*Primary Examiner* — Stephen F. Gerrity
(74) *Attorney, Agent, or Firm* — United IP Counselors, LLC

(57) ABSTRACT

A box-packing apparatus that reduces inefficiency attributable to the box-replacement process includes a first conveyance unit and a second conveyance unit. The first conveyance unit conveys articles. The second conveyance unit conveys the articles transferred from the first conveyance unit and feeds them into a box waiting downstream. When the second conveyance unit feeds a predetermined number of the articles into the box, the second conveyance unit retains the articles transferred from the first conveyance unit without feeding them into the box. Furthermore, in the box packing apparatus, the second conveyance unit may perform a back-feed operation when it retains the articles transferred from the first conveyance unit.

7 Claims, 10 Drawing Sheets

(51) Int. Cl.
*B65B 5/10* (2006.01)
*B65B 35/10* (2006.01)
*B65B 35/24* (2006.01)
*B65B 35/44* (2006.01)
*B65B 35/54* (2006.01)

(52) U.S. Cl.
CPC ............ *B65B 35/24* (2013.01); *B65B 35/246* (2013.01); *B65B 35/44* (2013.01); *B65B 35/54* (2013.01)

(58) Field of Classification Search
USPC .......................... 53/244, 249, 250, 251, 393
See application file for complete search history.

(56) References Cited

U.S. PATENT DOCUMENTS

| 6,622,848 B1 | 9/2003 | Lattimer et al. |
| 2006/0131131 A1* | 6/2006 | Mayer .................. B65G 47/715 |
| | | 198/431 |
| 2010/0170201 A1* | 7/2010 | Aquarius ................ B65B 35/56 |
| | | 53/531 |

FOREIGN PATENT DOCUMENTS

| EP | 3687905 B1 | 8/2020 |
| JP | H06-003806 U | 1/1994 |
| WO | 2021053571 A1 | 3/2021 |

OTHER PUBLICATIONS

Extended European Search Report dated May 24, 2024, issued in connection with corresponding European application 23206609.2-1014.

* cited by examiner

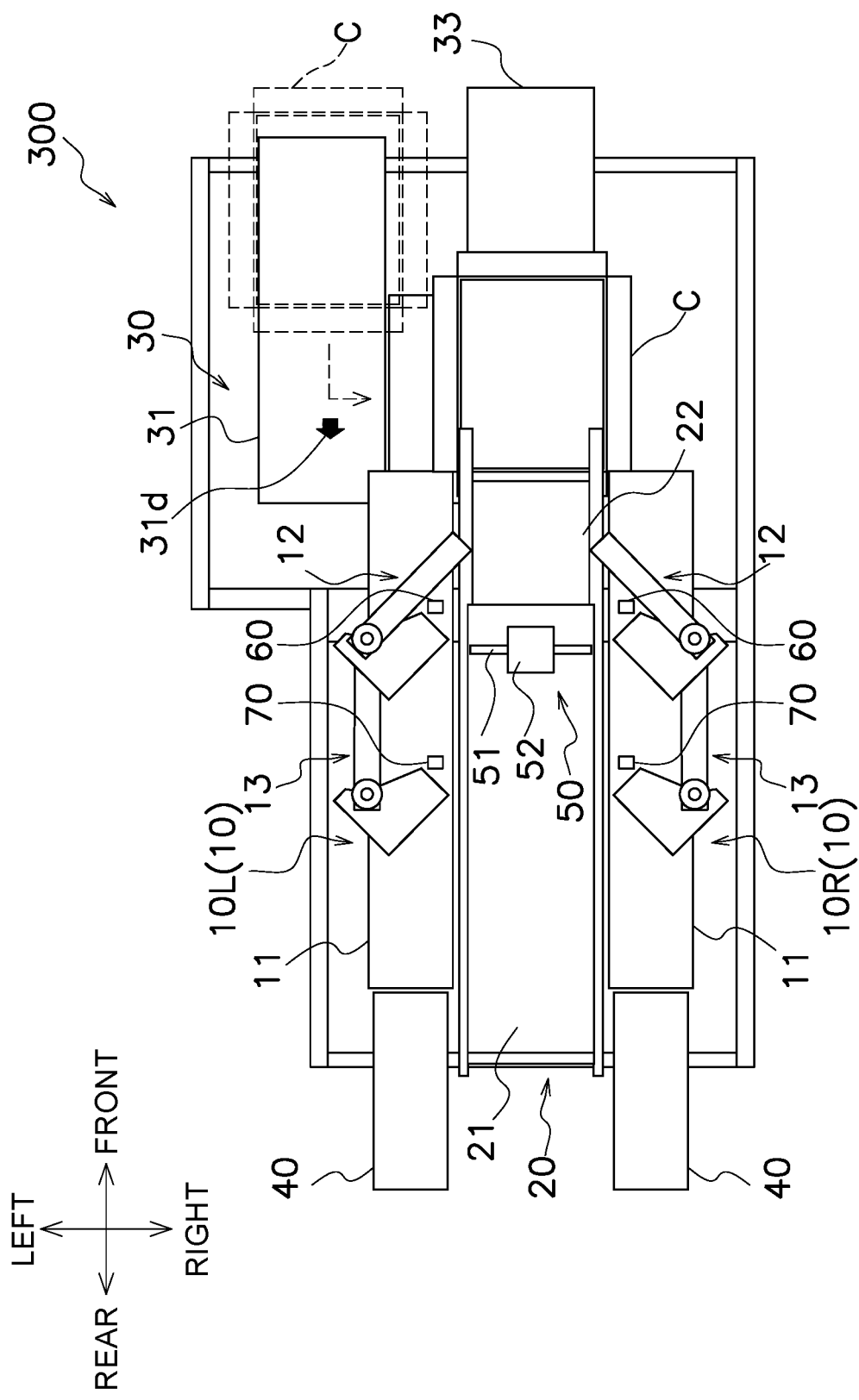
F I G. 6A

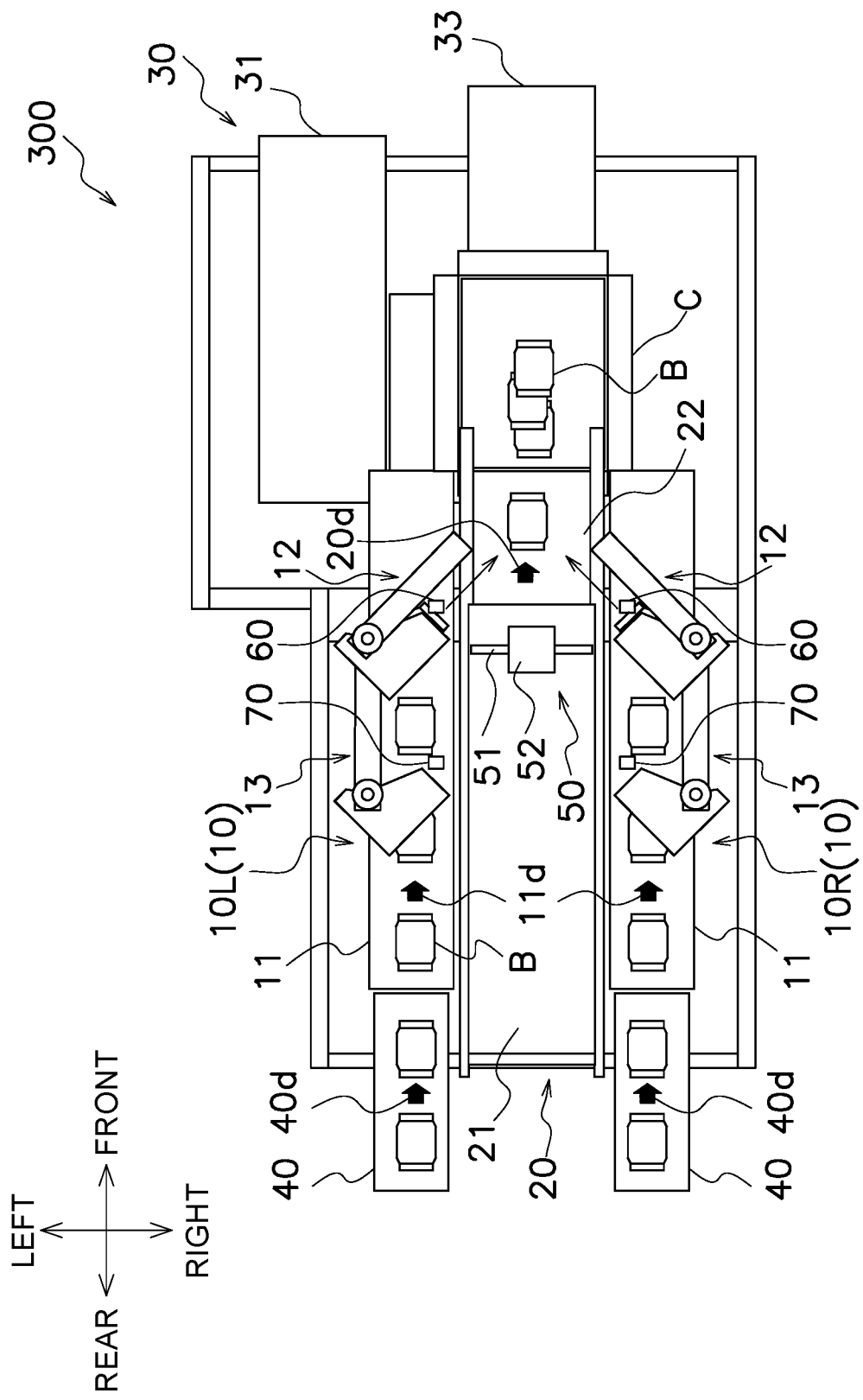
F I G. 6B

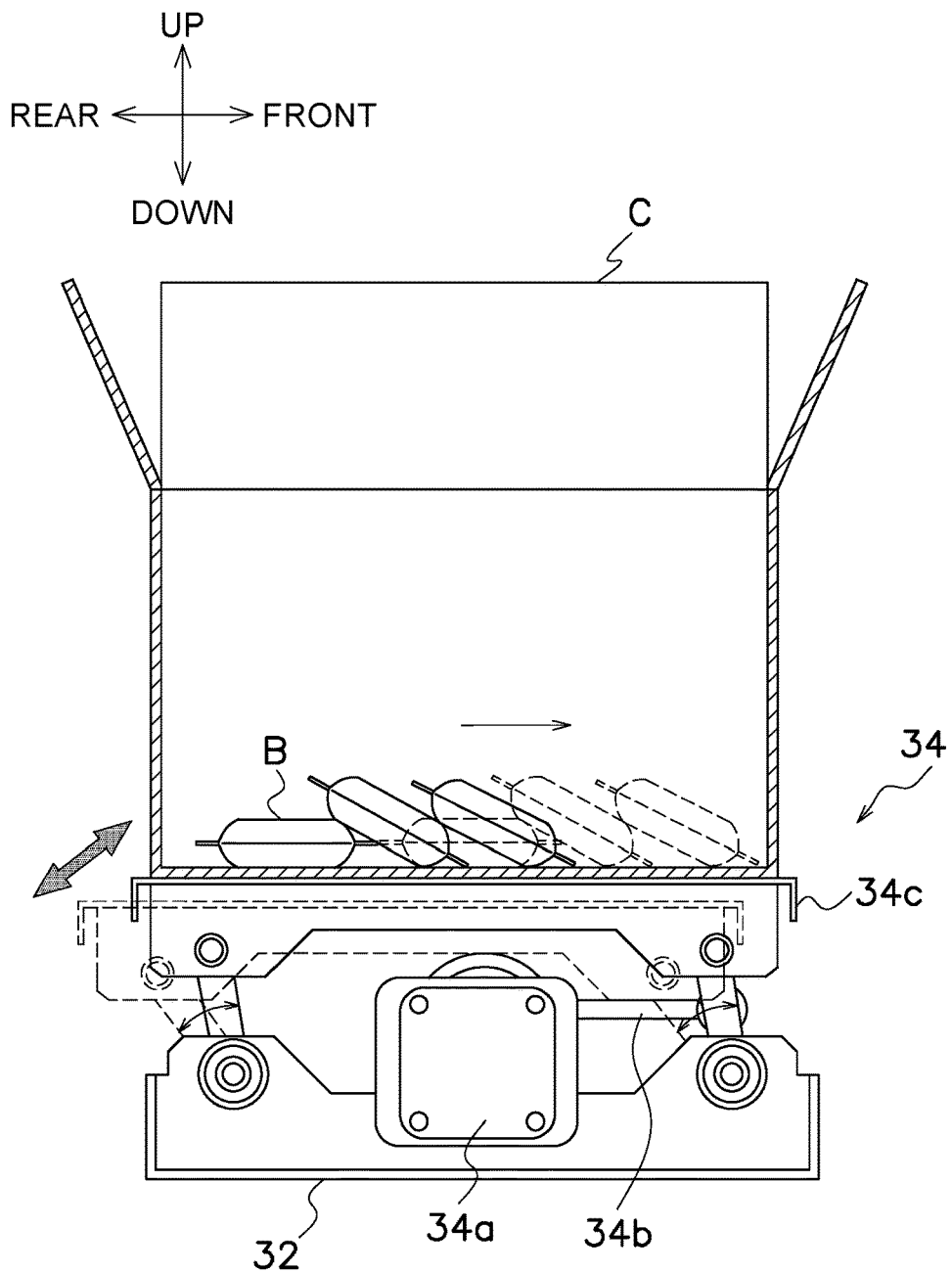
F I G. 7

BOX PACKING APPARATUS

CROSS-REFERENCE TO RELATED APPLICATIONS

This application is based on and claims the priority benefit of Japanese Patent Application No. 2022-176485 filed Nov. 2, 2022, the contents of which are incorporated by reference.

BACKGROUND

Technical Field

The present disclosure relates to box packing apparatus.

Related Art

Patent document 1 (JP-U No. H6-3806) discloses a box packing apparatus (an automated snack food packing apparatus) that drops, into a box conveyed directly under the terminal end portion of a supply conveyor, products (snack food) that are sequentially supplied by the supply conveyor. In box packing apparatus such as disclosed in patent document 1, when a predetermined number of articles (products) become packed in a box, a new empty box is conveyed to the box packing position (the position where the articles are dropped), replacing the box in which the articles have been packed. The box-replacement process requires a certain amount of time, so the supply conveyor is temporarily stopped, or the distance between the articles conveyed by the supply conveyor is increased, to prevent the articles from dropping from the supply conveyor during the box-replacement process. However, no matter which means is used, there is the problem that efficient conveyance of the articles is hindered such that packing efficiency is reduced.

SUMMARY

A box packing apparatus in accordance with the claimed invention can inhibit or reduce reduction in packing efficiency caused by the box-replacement process.

A box packing apparatus of a first aspect includes a first conveyance unit and a second conveyance unit. The first conveyance unit conveys articles. The second conveyance unit conveys the articles transferred from the first conveyance unit and feeds them into a box waiting downstream. When the second conveyance unit feeds a predetermined number of the articles into the box, the second conveyance unit retains the articles transferred from the first conveyance unit without feeding them into the box.

In this box packing apparatus, during the box-replacement process the second conveyance unit can retain the articles transferred from the first conveyance unit, so efficient conveyance of the articles does not decline. Consequently, according to this box packing apparatus, a reduction in packing efficiency caused by the box-replacement process is inhibited.

A box packing apparatus of a second aspect is the box packing apparatus of the first aspect, wherein the second conveyance unit performs a back-feed operation when it retains the articles transferred from the first conveyance unit.

In this box packing apparatus, the second conveyance unit performs a back-feed operation, so the second conveyance unit can retain more of the articles transferred from the first conveyance unit. Consequently, according to this box packing apparatus, a reduction in packing efficiency caused by the box-replacement process is further inhibited.

A box packing apparatus of a third aspect is the box packing apparatus of the first aspect or the second aspect, wherein the first conveyance unit has a first conveyance surface on which the articles are placed and conveyed along a conveyance direction. The first conveyance unit includes a left-side first conveyance unit and a right-side first conveyance unit disposed in such a way that their conveyance directions are parallel to each other. The second conveyance unit is disposed between the left-side first conveyance unit and the right-side first conveyance unit. The second conveyance unit has a second conveyance surface, positioned vertically lower than the first conveyance surfaces of each of the left-side first conveyance unit and the right-side first conveyance unit, on which the articles are placed and conveyed.

According to this box packing apparatus, the box packing apparatus includes two first conveyance units, so it can pack the articles in a short amount of time compared to a case where it includes just one first conveyance unit. Furthermore, according to this box packing apparatus, the second conveyance surface is lower than the first conveyance surfaces, so even if the second conveyance unit has retained a large quantity of the articles, the retained articles are inhibited from spilling from the second conveyance unit back to the first conveyance unit.

A box packing apparatus of a fourth aspect is the box packing apparatus of any of the first aspect to the third aspect, wherein the second conveyance unit has a retention unit and a feed unit. The retention unit retains the articles transferred from the first conveyance unit. The feed unit feeds the articles into the box.

In this box packing apparatus, the feed unit is provided separately from the retention unit, so the size and shape of the feed unit can be changed to various sizes and shapes independently of the retention unit. Consequently, according to this box packing apparatus, by changing the size and shape of the feed unit, the articles can be packed in boxes of various sizes and shapes.

A box packing apparatus of a fifth aspect is the box packing apparatus of the fourth aspect, wherein the feed unit is a shuttle conveyor or a telescopic conveyor that can telescope along a conveyance direction of the first conveyance unit.

According to this box packing apparatus, the feed unit can telescope along the conveyance direction while feeding the articles, so the articles are inhibited from being unevenly packed.

A box packing apparatus of a sixth aspect is the box packing apparatus of any of the first aspect to the fifth aspect, wherein the first conveyance unit has a first transfer unit and a second transfer unit. The first transfer unit transfers to the second conveyance unit the articles that are fed into a first box that is the box. The second transfer unit transfers to the second conveyance unit the articles that are fed into a second box that is the box and into which the articles are fed after being fed into the first box. The second transfer unit is disposed upstream of the first transfer unit in a conveyance direction of the first conveyance unit.

In this box packing apparatus, during the box-replacement process the second conveyance unit can retain the articles transferred from the first conveyance unit because the second transfer unit transfers the articles to the second conveyance unit, so efficient conveyance of the articles is inhibited from being hindered. Consequently, according to this box packing apparatus, a reduction in packing efficiency caused by the box-replacement process is inhibited.

A box packing apparatus of a seventh aspect is the box packing apparatus of the sixth aspect, wherein the first conveyance unit further includes a third transfer unit that transfers to the second conveyance unit the articles whose distance to the articles conveyed next to them on the downstream side in the conveyance direction is smaller than a predetermined distance.

According to this box packing apparatus, the third transfer unit ensures an appropriate distance between the articles that are next to each other in the conveyance direction, so a situation where the second transfer unit does not transfer the articles to the retention unit due to the distance between the articles being narrow is inhibited.

A box packing apparatus of an eighth aspect is the box packing apparatus of the sixth aspect, wherein the first conveyance unit conveys the articles that are fed into the second box at a slower speed than the speed at which it conveys the articles that are fed into the first box.

According to this box packing apparatus, the articles that have been transferred from the first conveyance unit to the second conveyance unit for the purpose of retention are inhibited from been mistakenly fed into the box. Furthermore, according to this box packing apparatus, a reduction in packing efficiency caused by the box-replacement process is further inhibited.

A box packing apparatus of a ninth aspect is the box packing apparatus of any of the first aspect to the eighth aspect, further including a vibration unit that vibrates the box.

According to this box packing apparatus, the vibration unit evens out the articles that are uneven inside the box, so the articles are inhibited from being unevenly packed.

BRIEF DESCRIPTION OF THE DRAWINGS

FIG. 6A is a plan view of the box packing apparatus 300 showing the operation of each part in a box infeed conveyance process of the box packing operation;

FIG. 6B is a plan view of the box packing apparatus 300 showing the operation of each part in a first article feed process of the box packing operation;

FIG. 7 is a side view showing the schematic configuration of a vibration unit 34.

DETAILED DESCRIPTION

An embodiment of the claimed invention will be described below with reference to the drawings. It will be noted that, in the description of the drawings, identical elements are assigned identical reference signs and redundant description will be omitted. In the following description, the directions of front/rear, upper/lower, and left/right relative to a box packing apparatus 300 are used for the sake of conveyance. In several of the drawings, orthogonal axes representing these directions are shown. The front and rear direction and the left and right direction are both horizontally extending directions. The up and down direction is equivalent to the vertical direction.

(1) Overall Configuration

Figure 1:
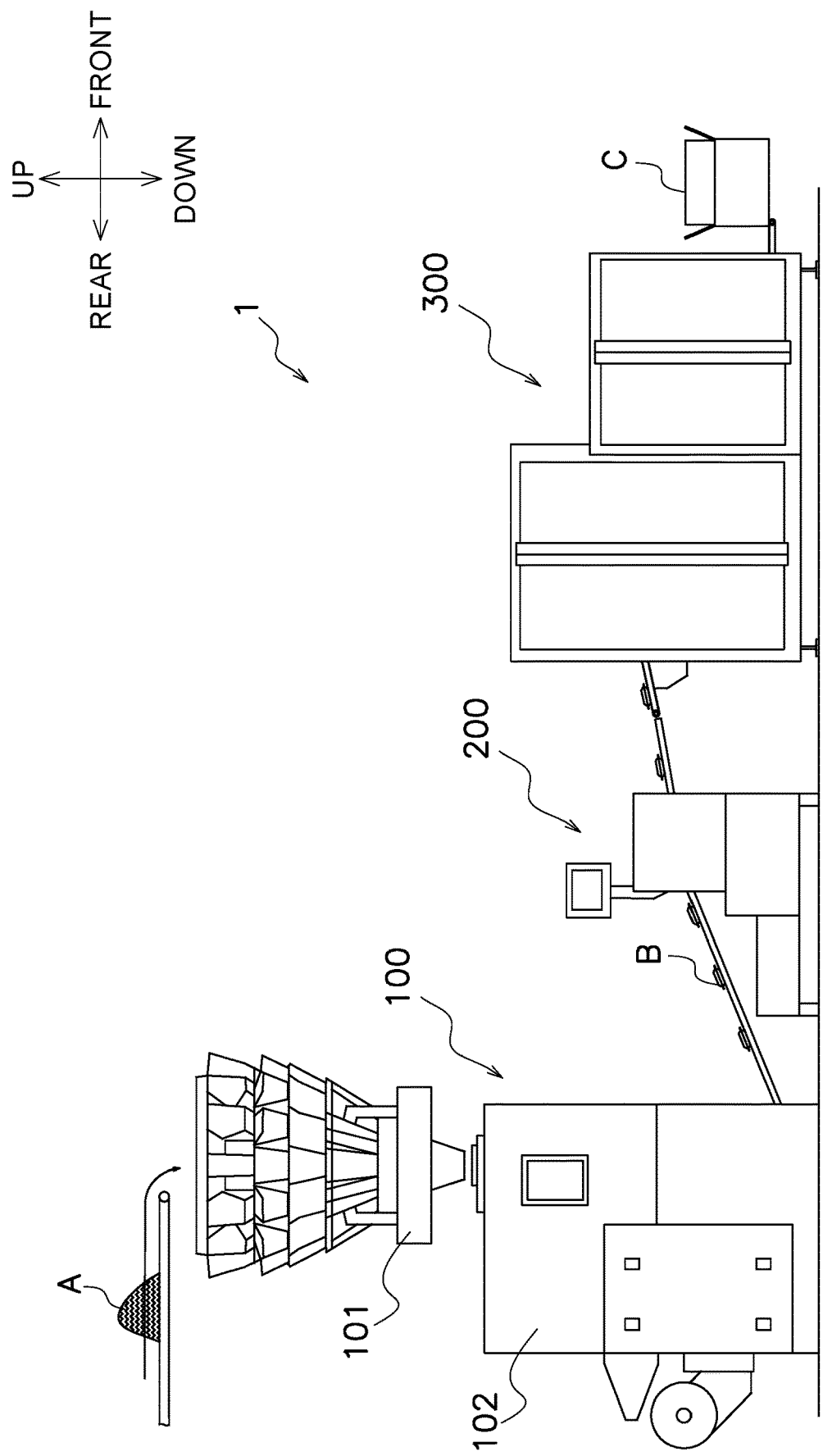
FIG. 1 is a schematic diagram illustrating a packaging and box packing line including a box packing apparatus 300 according to one embodiment of the claimed invention.
Figure 2:
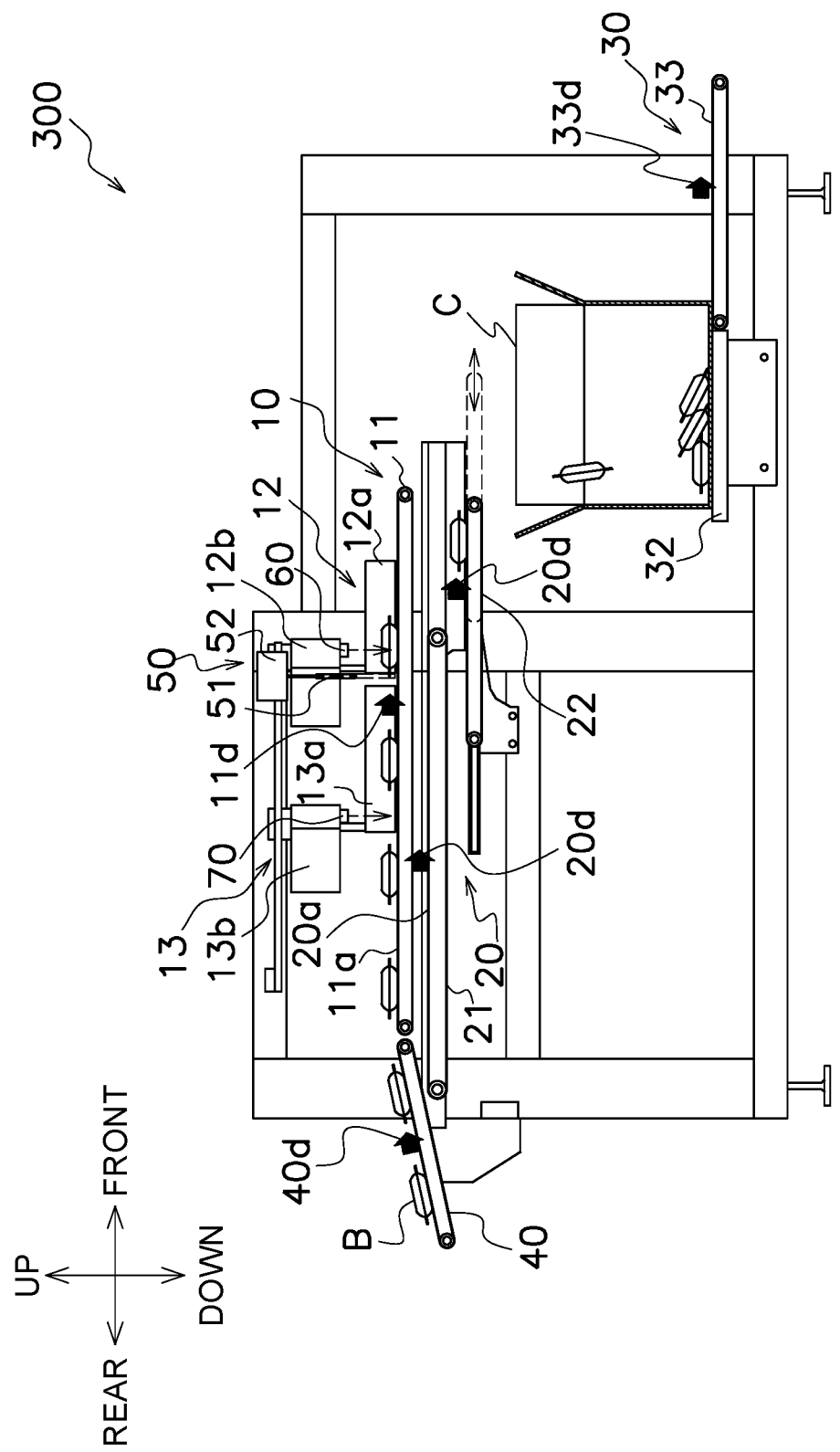
FIG. 2 is a side view of the box packing apparatus 300.
Figure 3:
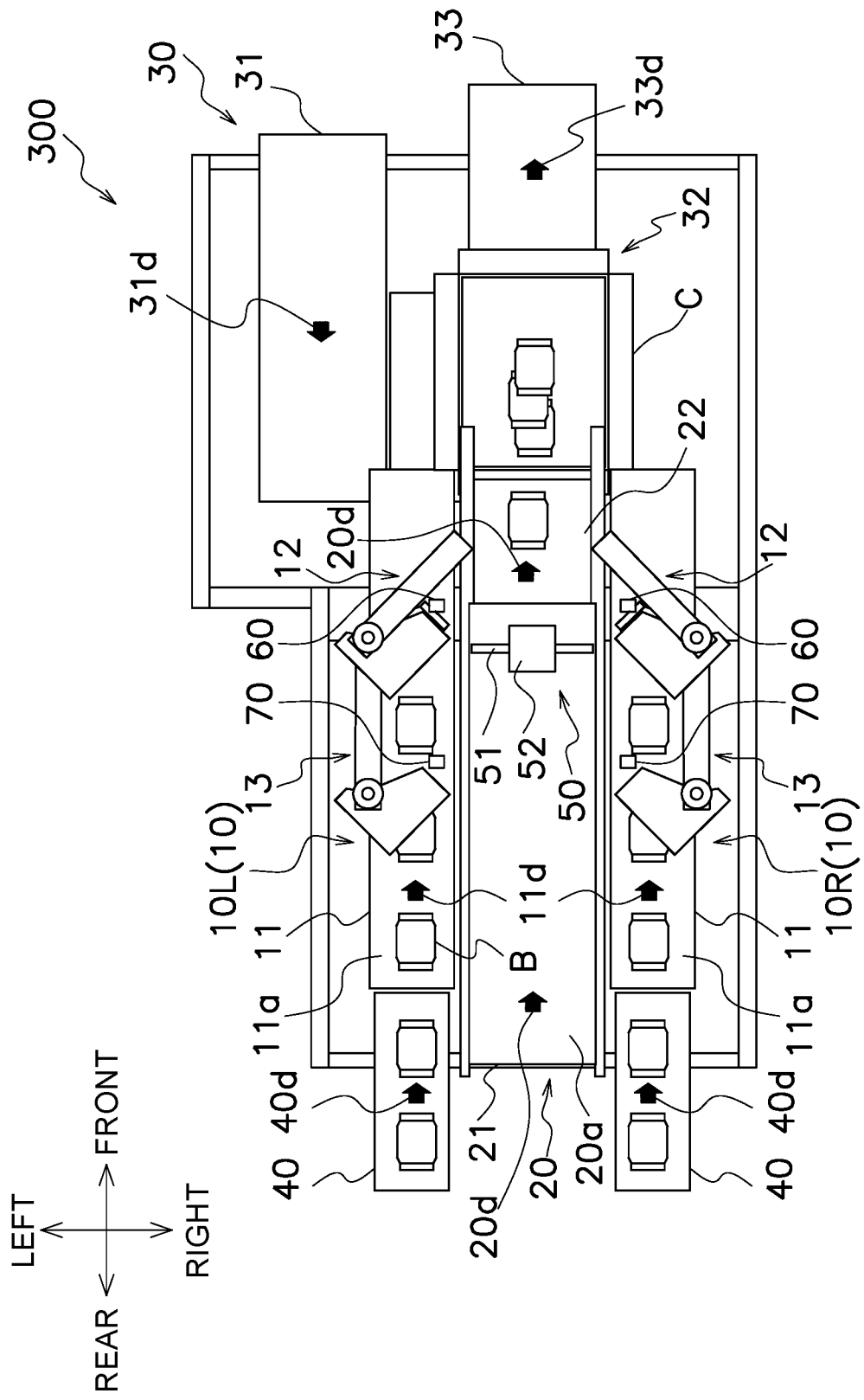
FIG. 3 is a plan view of the box packing apparatus 300.

FIG. 1 is a schematic diagram illustrating the overall configuration of a packaging and box packing line 1 including a box packing apparatus 300 in accordance with the claimed invention. FIG. 2 is a side view of the box packing apparatus 300. FIG. 3 is a plan view of the box packing apparatus 300. The packaging and box packing line 1 includes a packaging machine 100, an inspection apparatus 200, and the box packing apparatus 300. It will be noted that FIG. 1 shows the box packing apparatus 300 as covered by a cover.

The packaging machine 100 packages, a predetermined quantity at a time, a product A manufactured by a manufacturing apparatus (not shown in the drawings). The packaging apparatus 100 has a combination weighing machine 101 and a bagmaking and packaging machine 102. The combination weighing machine 101 is disposed above the bagmaking and packaging machine 102. The combination weighing machine 101 weighs a quantity of the product A to be put into one bag B and drops the product A to the bagmaking and packaging machine 102. The bagmaking and packaging machine 102 is, for example, a vertical pillow bagmaking and packaging machine, which packages the product A weighed by the combination weighing machine 101 in bags B (vertical pillow bags) and supplies the bags B to the inspection apparatus 200. Although this is not intended to be limiting, the product A may, for example, be a snack food.

The inspection apparatus 200 inspects the weights of, and whether or not there are pinholes or foreign matter in, the bags B supplied from the packaging machine 100 and supplies the bags B to the box packing apparatus 300.

The box packing apparatus 300 executes a box packing operation that packs in a box C a predetermined accommodation number N of the bags B supplied from the inspection apparatus 200. The box packing apparatus 300 includes a first bag conveyance unit 10, a second bag conveyance unit 20, a box conveyance unit 30, a bag infeed conveyance unit 40, a shutter unit 50, a first sensor 60, a second sensor 70, and a control unit 90. The bags B are an example of articles.

(2) Detailed Configuration (2-1) First Bag Conveyance Unit

The first bag conveyance unit 10 conveys the bags B and transfers them at a predetermined timing to the second bag conveyance unit 20. The first bag conveyance unit 10 has a main conveyance unit 11, a first transfer unit 12, and a second transfer unit 13. The first bag conveyance unit 10 is controlled by the control unit 90. The first bag conveyance unit 10 is an example of a first conveyance unit.

In the present embodiment, the box packing apparatus 300 has two first bag conveyance units 10 disposed in such a way that conveyance directions 11d (described later) of the main conveyance units 11 are parallel to each other. The two first bag conveyance units 10 are disposed bilaterally symmetrical to each other across the second bag conveyance unit 20 in plan view. The two first bag conveyance units 10 have the same structures except for the fact that they are bilaterally symmetrical. Below, when distinguishing between and describing the two first bag conveyance units 10, facing downstream (described later) in the conveyance directions 11d the first bag conveyance unit 10 disposed on the right side (the right side across the second bag conveyance unit 20) will be called a right-side first bag conveyance unit 10R and the first bag conveyance unit 10 disposed on the left side will be called a left-side first bag conveyance unit 10. The right-side first bag conveyance unit 10R is an example of a right-side first conveyance unit. The left-side first bag conveyance unit 10L is an example of a left-side first conveyance unit.

(2-1-1) Main Conveyance Unit

The main conveyance unit 11 has a first conveyance surface 11a on which the bags B are placed and conveyed along the conveyance direction 11d. The main conveyance unit 11 is a belt conveyor disposed in such a way that the conveyance direction 11d is along the front and rear direction. Rearward in the conveyance direction 11d is upstream and forward in the conveyance direction 11d is downstream. The first conveyance surface 11a is the upper surface of the main conveyance unit 11.

(2-1-2) First Transfer Unit

The first transfer unit 12 transfers the bags B at a predetermined timing from the main conveyance unit 11 to the second bag conveyance unit 20. Details will be described later, but in the box packing operation the first transfer unit 12 transfers, to a feed unit 22 (described later) of the second bag conveyance unit 20, the bags B conveyed as far as the vicinity of the downstream end portion of the main conveyance unit 11 in the conveyance direction 11d.

The first transfer unit 12 is disposed adjacent to the feed unit 22 in the left and right direction upstream of the downstream-end portion of the main conveyance unit 11 in the conveyance direction 11d. The first transfer unit 12 shifts between a first state, in which it allows the bags B to be conveyed along the conveyance direction 11d, and a second state, in which it transfers the conveyed bags B to the second bag conveyance unit 20.

In the present embodiment, the first transfer unit 12 is an arm sorter that has a sorting arm 12a and a motor 12b. The motor 12b shifts the sorting arm 12a between the first state and the second state based on instructions from the control unit 90.

(2-1-3) Second Transfer Unit

The second transfer unit 13 transfers the bags B at a predetermined timing from the main conveyance unit 11 to the second bag conveyance unit 20. Details will be described later, but in the box packing operation the second transfer unit 13 transfers the bags B to a retention unit 21 (described later) of the second bag conveyance unit 20 during a box-replacement process in which the boxes C are replaced.

The second transfer unit 13 is disposed adjacent to the retention unit 21 in the left and right direction upstream of the first transfer unit 12 in the conveyance direction 11d. The second transfer unit 13 changes between a first state, in which it allows the bags B to be conveyed along the conveyance direction 11d, and a second state, in which it transfers the conveyed bags B to the second bag conveyance unit 20.

In the present embodiment, the second transfer unit 13 is an arm sorter that has a sorting arm 13a and a motor 13b. The motor 13b switches the sorting arm 13a between the first state and the second state based on instructions from the control unit 90.

(2-2) Second Bag Conveyance Unit

The second bag conveyance unit 20 conveys along a conveyance direction 20d the bags B transferred from the first bag conveyance unit 10 and feeds them into a box C waiting downstream. Rearward in the conveyance direction 20d is upstream and forward in the conveyance direction 20d is downstream. When the second bag conveyance unit 20 feeds the accommodation number N of the bags B into the box C, the second bag conveyance unit 20 temporarily retains the bags B transferred from the first bag conveyance unit 10 without feeding them into the box. The second bag conveyance unit 20 is controlled by the control unit 90. The second bag conveyance unit 20 is an example of a second conveyance unit.

The second bag conveyance unit 20 is disposed between the left-side first bag conveyance unit 10L and the right-side first bag conveyance unit 10R in such a way that the conveyance direction 20d is parallel to the conveyance directions 11d in plan view. The second bag conveyance unit 20 has a second conveyance surface 20a, positioned vertically lower than the first conveyance surface 10a of the first bag conveyance unit 10, on which the bags B are placed and conveyed. Although this is not intended to be limiting, the second conveyance surface 20a is in a position about 120 mm lower in the up and down direction (vertical direction) than the first conveyance surface 10a. The second bag conveyance unit 20 has a retention unit 21 and a feed unit 22.

(2-2-1) Retention Unit

The retention unit 21 conveys along the conveyance direction 20d the bags B transferred from the first bag conveyance unit 10 and delivers them to the feed unit 22. The retention unit 21 also temporarily retains the bags B transferred from the first bag conveyance unit 10. The retention unit 21 is a belt conveyor disposed in such a way that the conveyance direction 20d is along the front and rear direction. The retention unit 21 may perform a back-feed operation when it retains the bags B transferred from the first bag conveyance unit 10. The retention unit 21 is disposed in a position where the bags B transferred from the second transfer unit 13 move onto its upper surface. The second conveyance surface 20a is the upper surface of the retention unit 21.

(2-2-2) Feed Unit

The feed unit 22 conveys along the conveyance direction 20d the bags B transferred from the first bag conveyance unit 10 and the retention unit 21 and feeds them into the box C. The feed unit 22 is a belt conveyor disposed in such a way that the conveyance direction 20d is along the front and rear direction. The feed unit 22 is disposed in such a way that its downstream end portion is positioned above a box packing position 32 (described later) of the box conveyance unit 30 and below the downstream end portion of the retention unit 21. The feed unit 22 is also disposed in a position where the bags B transferred from the first transfer unit 12 move onto its upper surface.

In the present embodiment, as indicated by the dashed line in FIG. 2, the feed unit 22 is a shuttle conveyor or a telescopic conveyor that can telescope along the conveyance direction 20d. More specifically, the downstream end portion of the feed unit 22 can be reciprocated along the conveyance direction 20d above the box packing position 32 as a result of the feed unit 22 telescoping.

(2-3) Box Conveyance Unit

The box conveyance unit 30 performs infeed conveyance of the boxes C in which the bags B are not yet packed to the box packing position 32 (described later) and outfeed conveyance of the boxes C in which the bags B have been packed. The box conveyance unit 30 is provided lower than the second bag conveyance unit 20 so that it can receive the bags B fed from the feed unit 22. The box conveyance unit 30 has an infeed conveyance unit 31, a box packing position 32, and an outfeed conveyance unit 33. The box conveyance unit 30 is controlled by the control unit 90.

(2-3-1) Infeed Conveyance Unit

The infeed conveyance unit 31 conveys along a conveyance direction 31*d* the boxes C in which the bags B are not yet packed and transfers them to the box packing position 32. The infeed conveyance unit 31 is a belt conveyor disposed in such a way that its conveyance direction 31*d* is along the front and rear direction. Forward in the conveyance direction 31*d* is upstream and rearward in the conveyance direction 31*d* is downstream. The boxes C conveyed as far as the downstream end portion of the infeed conveyance unit 31 are transferred by a pusher (not shown in the drawings) to the box packing position 32.

(2-3-2) Box Packing Position The box packing position 32 is a position where the boxes C into which the bags B are fed from the feed unit 22 of the second bag conveyance unit 20 wait. The box packing position 32 is positioned under the downstream end portion of the feed unit 22. In the present embodiment, the box packing position 32 is disposed on the downstream right side of the infeed conveyance unit 31.

(2-3-3) Outfeed Conveyance Unit

The outfeed conveyance unit 33 conveys out, along a conveyance direction 33*d*, the boxes C in which the bags B have been packed. In the present embodiment, the outfeed conveyance unit 33 is a belt conveyor disposed in such a way that its conveyance direction 33*d* is along the front and rear direction. Rearward in the conveyance direction 33*d* is upstream and forward in the conveyance direction 33*d* is downstream. In the present embodiment, the outfeed conveyance unit 33 is disposed in front of the box packing position 32. The outfeed conveyance unit 33 is disposed in such a way that the upper surface of its upstream end portion touches the bottom surfaces of the boxes C disposed in the box packing position 32. Because of this, the boxes C disposed in the box packing position 32 are conveyed downstream of the outfeed conveyance unit 33 as a result of the outfeed conveyance unit 33 being driven.

(2-4) Bag Infeed Conveyance Unit

The bag infeed conveyance unit 40 conveys, along a conveyance direction 40*d*, the bags B supplied from the inspection apparatus 200 and feeds them to the first bag conveyance unit 10. The bag infeed conveyance unit 40 is a belt conveyor disposed in such a way that its conveyance direction 40*d* is along the front and rear direction. Rearward in the conveyance direction 40*d* is upstream and forward in the conveyance direction 40*d* is downstream. The bag infeed conveyance unit 40 is disposed in such a way that at its upstream end portion it receives the bags B supplied from the inspection apparatus 200 and at its downstream end portion it transfers the bags B to the first bag conveyance unit 10. The box packing apparatus 300 has two bag infeed conveyance units 40, a bag infeed conveyance unit 40 that feeds the bags B to the right-side first bag conveyance unit 10R and a bag infeed conveyance unit 40 that feeds the bags B to the left-side first bag conveyance unit 10L. The bag infeed conveyance unit 40 is controlled by the control unit 90.

(2-5) Shutter Unit

The shutter unit 50 inhibits the bags B from moving downstream in the conveyance direction 20*d* when the retention unit 21 retains the bags B. The shutter unit 50 has a shutter body 51 and an actuator 52. The shutter unit 50 is controlled by the control unit 90.

(2-5-1) Shutter Body

The shutter body 51 is a tabular member. The shutter body 51 is disposed above the retention unit 21 and downstream of the second transfer unit 13 in the conveyance direction 20*d* in an attitude in which it is orthogonal to the front and rear direction.

(2-5-2) Actuator

The actuator 52 changes the position of the shutter body 51 between a first position and a second position as indicated by the dashed line in FIG. 2. The first position is a position where a gap between the lower end of the shutter body 51 and the second conveyance surface 20*a* in the up and down direction is greater than the height of the bags B in the up and down direction so that the bags B on the retention unit 21 are allowed to move downstream in the conveyance direction 20*d*. The second position is a position where the gap between the lower end of the shutter body 51 and the second conveyance surface 20*a* in the up and down direction is equal to or less than the height of the bags B in the up and down direction so that the bags B on the retention unit 21 are inhibited from moving downstream in the conveyance direction 20*d*.

(2-6) First Sensor

The first sensor 60 detects the bags B that the first transfer unit 12 has transferred to the second bag conveyance unit 20. In the present embodiment, the first sensor 60 is a photoelectric sensor. The first sensor 60 is disposed above the main conveyance unit 11 or the feed unit 22 and, as indicated by the dashed line in FIG. 2, projects detection light downward. The first sensor 60 sends detection signals to the control unit 90 when it detects the bags B.

(2-7) Second Sensor

The second sensor 70 detects the bags B that the second transfer unit 13 has transferred to the second bag conveyance unit 20. In the present embodiment, the second sensor 70 is a photoelectric sensor. The second sensor 70 is disposed above the main conveyance unit 11 or the retention unit 22 and, as indicated by the dashed line in FIG. 2, projects detection light downward. The second sensor 70 sends detection signals to the control unit 90 when it detects the bags B.

(2-8) Control Unit

Figure 4:
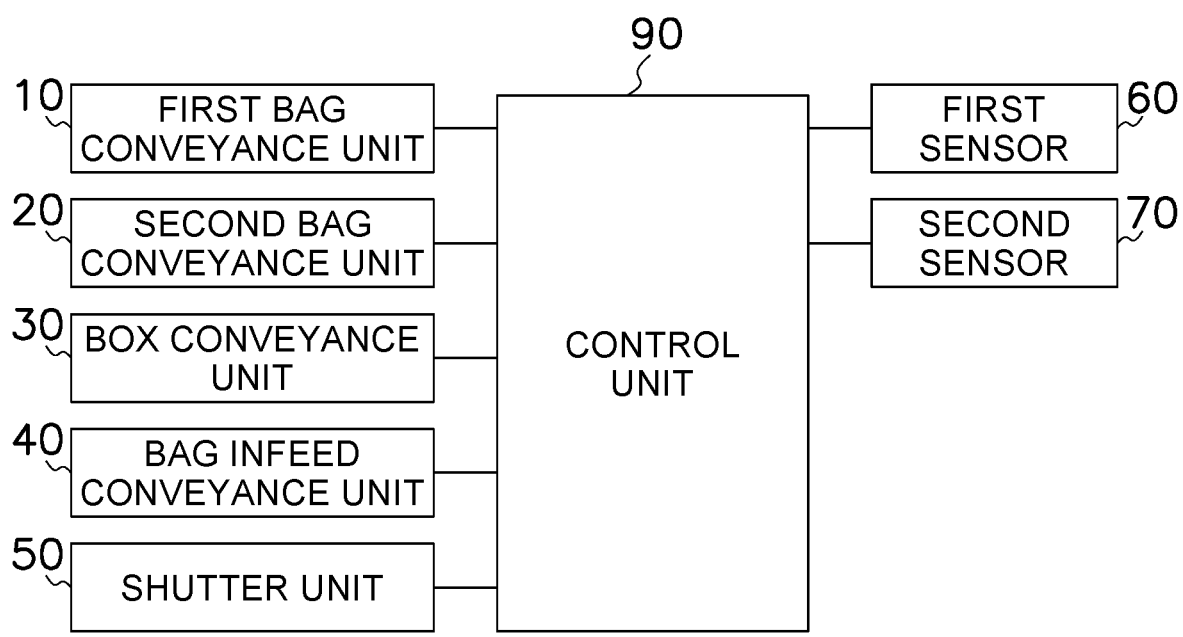
FIG. 4 is a block diagram of a control unit 90 used to control the box packing apparatus 300.

The control unit 90 controls each part of the box packing apparatus 300 to realize the box packing operation. Details about the box packing operation will be described later. FIG. 4 is a block diagram of the control unit 90. The control unit 90 is electrically connected to—so as to be capable of sending control signals to and receiving detection signals from—the first bag conveyance unit 10, the second bag conveyance unit 20, the box conveyance unit 30, the bag infeed conveyance unit 40, the shutter unit 50, the first sensor 60, and the second sensor 70.

The control unit 90 is realized by a computer. The control unit 90 includes a control processing unit and a storage unit. For the control processing unit, a processor such as a CPU or a GPU can be used. The control processing unit reads programs stored in the storage unit and performs predetermined processing in accordance with the programs. Moreover, the control processing unit can write processing results to the storage unit and read information stored in the storage unit in accordance with the programs.

(3) Box Packing Operation

Figure 5:
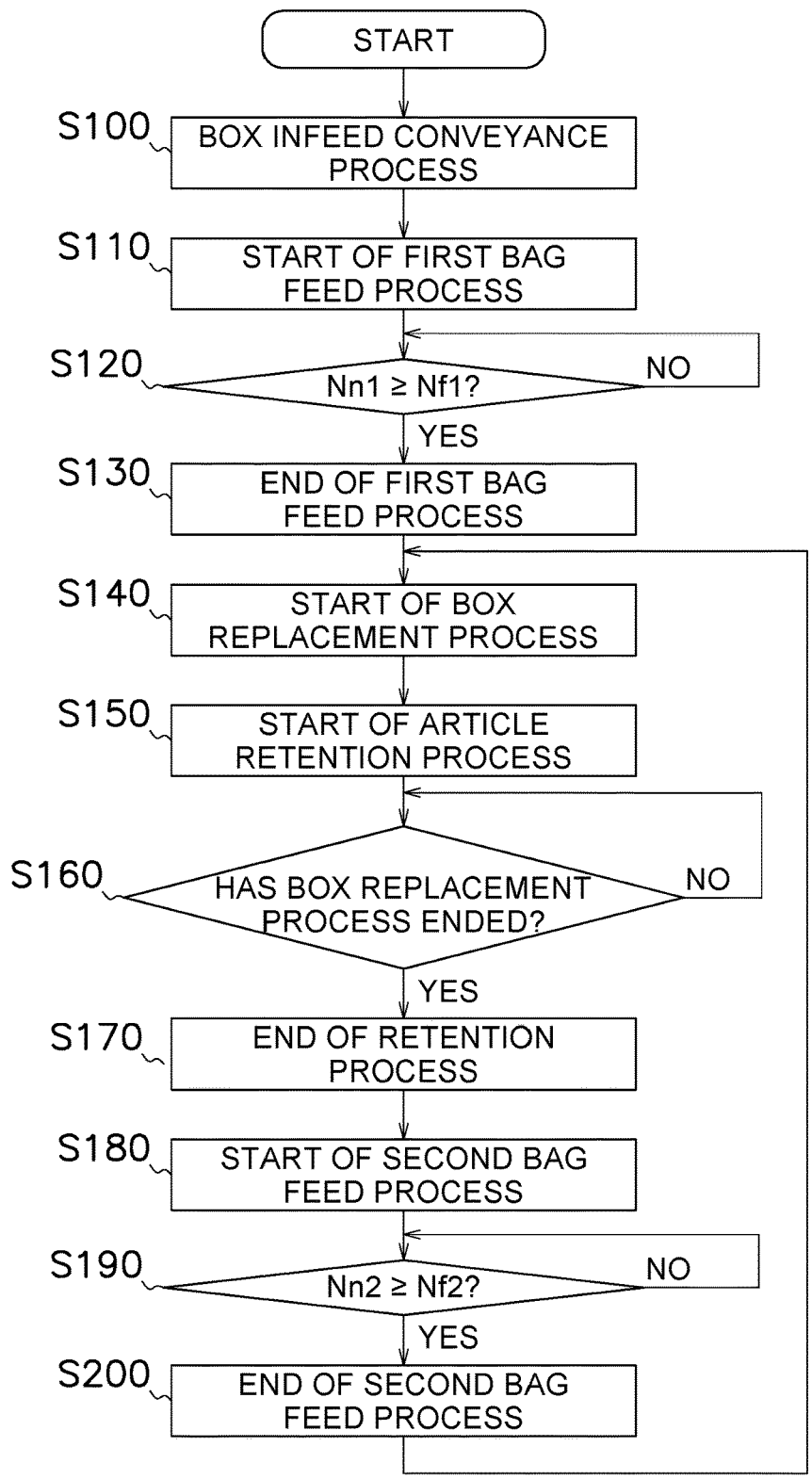
FIG. 5 is a flowchart of a box packing operation.
Figure 6C:
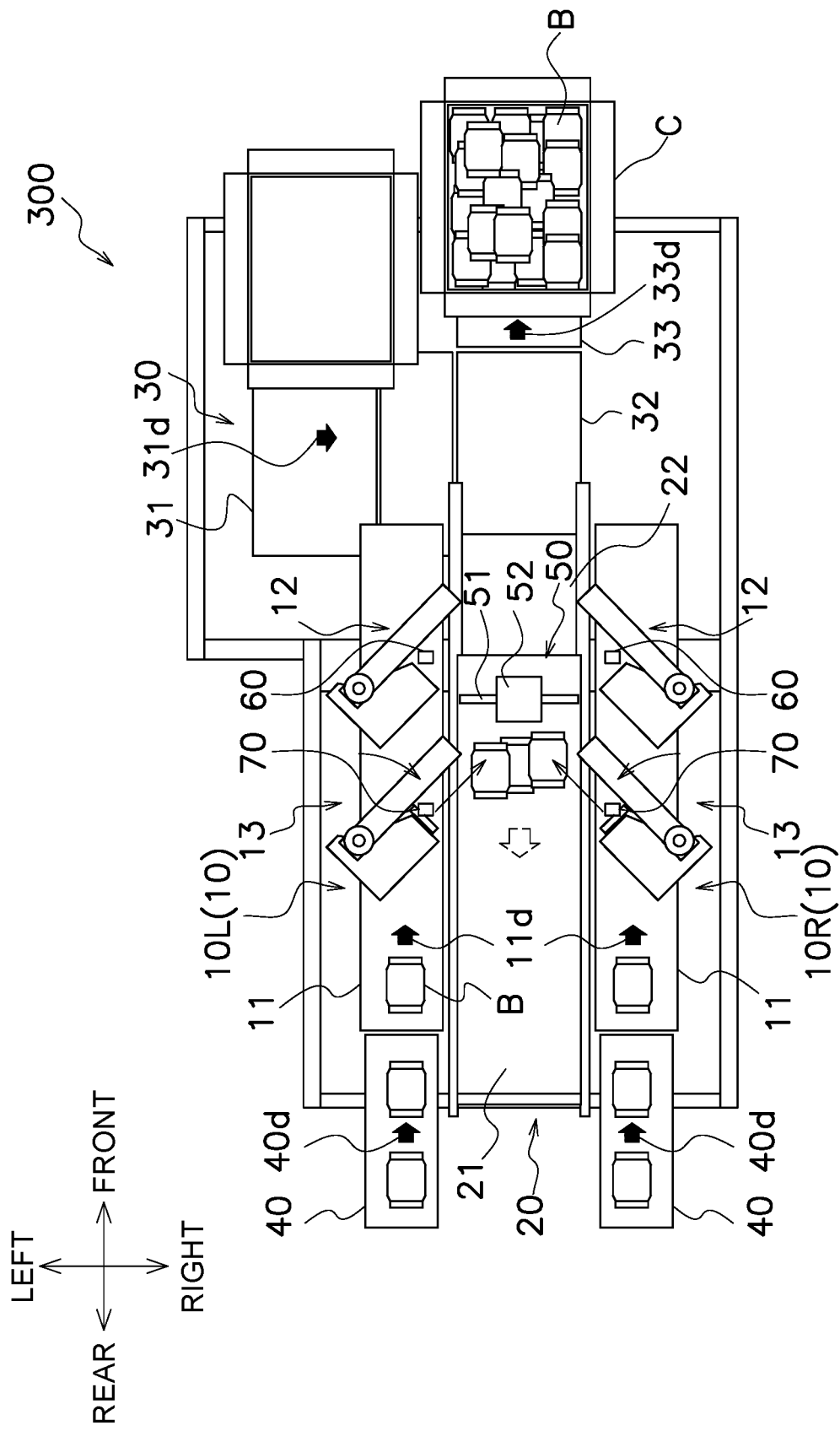
FIG. 6C is a plan view of the box packing apparatus 300 showing the operation of each part in an article retention process and a box-replacement process of the box packing operation.
Figure 6D:
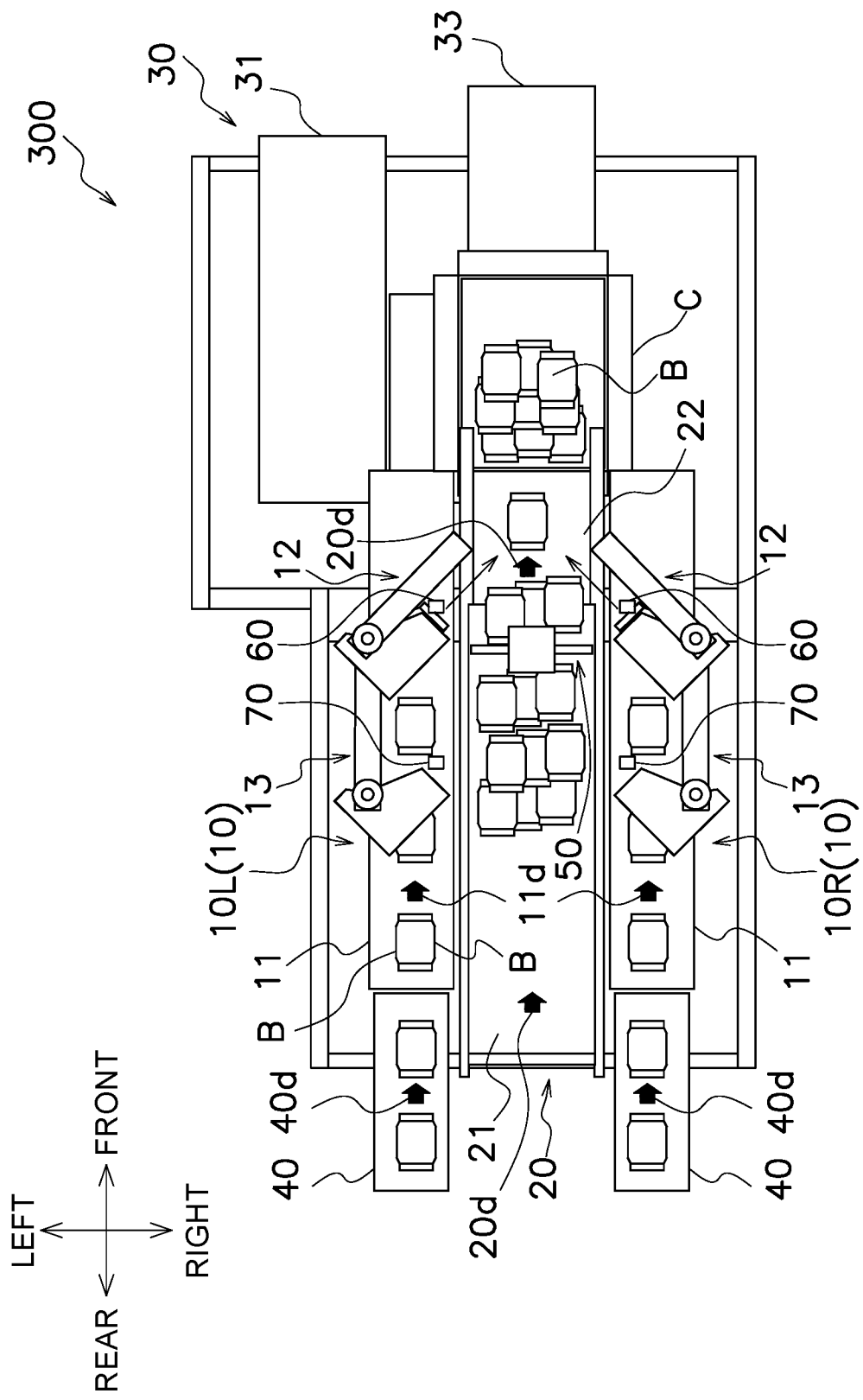
FIG. 6D is a plan view of the box packing apparatus 300 showing the operation of each part in a second article feed process of the box packing operation.

The box packing operation is an operation that repeatedly packs the predetermined accommodation number N of the bags B into the boxes C. The box packing operation includes a box infeed conveyance process, a first article feed process, a box-replacement process, an article retention process, and a second article feed process. FIG. 5 is a flowchart of the box packing operation. FIG. 6A is a plan view of the box packing apparatus 300 showing the operation of each part in the box infeed conveyance process of the box packing operation. FIG. 6B is a plan view of the box packing apparatus 300 showing the operation of each part in the first article feed process of the box packing operation. FIG. 6C is a plan view of the box packing apparatus 300 showing the operation of each part in the article retention process and the box-replacement process of the box packing operation. FIG. 6D is a plan view of the box packing apparatus 300 showing the operation of each part in the second article feed process of the box packing operation. The box packing operation starts when, for example, the packaging and box packing line 1 starts up (START).

In step S100 the control unit 90 performs the box infeed conveyance process. The box infeed conveyance process is a process that conveys in, to the box packing position 32, the boxes C. The box infeed conveyance process is a process where the box conveyance unit 30 conveys in, to the box packing position 32, a box C in which the bags B are not yet packed (see FIG. 6A). Specifically, the infeed conveyance unit 31 moves to the box packing position 32 a box C in which the bags B are not yet packed which a worker or the like operating the box packing apparatus 300 has placed on the upstream end portion of the infeed conveyance unit 31, and causes the box C to wait. The control unit 90 proceeds to step S110 when the box C moves to the box packing position 32.

In step S110 the control unit 90 starts the first article feed process, and then the control unit 90 proceeds to step S120. The first article feed process is a process that causes the feed unit 22 to feed into the box C the bags B conveyed by the first bag conveyance unit 10 (see FIG. 6B). In the first article feed process, the control unit 90 drives the main conveyance unit 11 of the first bag conveyance unit 10 and the feed unit 22 of the second bag conveyance unit 20, changes the first transfer unit 12 to the second state, and changes the second transfer unit 13 to the first state.

When the packaging and box packing line 1 is operated, the bags B that have transited the inspection apparatus 200 are fed one at a time to the upstream end portion of the bag infeed conveyance unit 40 so that there is a predetermined distance between each B and other bags B next to it along the conveyance direction 40d. The bag infeed conveyance unit 40 sequentially feeds the bags B to the first bag conveyance unit 10. In the first bag conveyance unit 10, the main conveyance unit 11 conveys the bags B. At this time, the second transfer unit 13 allows the bags B to be conveyed along the conveyance direction 11d because it is in the first state. In other words, the bags B transit the second transfer unit 13. The first transfer unit 12 transfers the bags B to the feed unit 22 of the second bag conveyance unit 20.

The feed unit 22 conveys the bags B and feeds them from its downstream end portion into the box C that is in the box packing position 32. The downstream end portion of the feed unit 22 is reciprocated along the conveyance direction 20d above the box packing position 32 while the feed unit 22 feeds the bags B into the box C. Because of this, the position where the bags B are fed changes so that the bags B are inhibited from being unevenly packed inside the box C.

In step S120 the control unit 90 judges whether a number Nn1 of the bags B that have been fed into the box C since the start of the first article feed process has reached a predetermined number Nf1. For the number Nn1, the control unit 90 uses, based on the detection signals of the second sensor 70, the number of the bags B that have transited the first transfer unit 12 and been fed into the box C since the control unit 90 started the first article feed process. The control unit 90 proceeds to step S130 when the number Nn1 becomes equal to or greater than the number Nf1 (YES). The control unit 90 proceeds to step S120 when the number Nn1 is less than the number Nf1 (NO). In other words, in step S120 the control unit 90 waits until the number Nn1 becomes equal to or greater than the number Nf1.

The number Nf1 may be the accommodation number N of the bags B packed in the box C or may be a number Nb smaller than the accommodation number N. The number Nb is set to inhibit the number of the bags B fed into the box C from exceeding the accommodation number N as a result of the bags B that had been conveyed by the main conveyance unit 11 just before the end of the first article feed process being packed after the end of the first article feed process. By ending the first article feed process at the point in the time when the number Nn1 reaches the number Nb, the box packing apparatus 300 can inhibit the number of the bags B fed into the box C from exceeding the accommodation number N. Although this is not intended to be limiting, the number Nb may, for example, be a number equal to about 95% of the accommodation number N.

In step S130 the control unit 90 ends the first article feed process, and then the control unit 90 proceeds to step S140. Thus, the packing of one box C ends. The main conveyance unit 11 of the first bag conveyance unit 10 is driven also during the article retention process that is started next. For this reason, the control unit 90 need not stop driving the main conveyance unit 11 in step S130.

In step S140 the control unit 90 starts the box-replacement process, and then the control unit 90 proceeds to step S150. The box-replacement process is a process that conveys out the box C in which the bags B have been packed and conveys in, to the box packing position 32, a box C in which the bags B are not yet packed (see FIG. 6C). Specifically, the outfeed conveyance unit 33 conveys, from the box packing position 32 to the downstream end portion of the outfeed conveyance unit 33, the box C in which the bags B have been packed. A worker or the like operating the box packing apparatus 300 removes from the box packing apparatus 300 (the box conveyance unit 30) the box C that has reached the downstream end portion of the outfeed conveyance unit 33. Furthermore, the infeed conveyance unit 31 moves to the box packing position 32 the box C in which the bags B are not yet packed which the worker or the like operating the box packing apparatus 300 has placed on the upstream end portion of the infeed conveyance unit 31.

In step S150 the control unit 90 starts the article retention process, and then the control unit 90 proceeds to step S160. The article retention process is a process that retains the bags B in the retention unit 21 of the second bag conveyance unit 20. In the article retention process, the control unit 90 drives the main conveyance unit 11 of the first bag conveyance unit 10, does not drive the retention unit 21 of the second bag conveyance unit 20, changes the first transfer unit 12 to the first state or the second state, changes the second transfer unit 13 to the second state, and moves the shutter body 51 to the second position (see FIG. 6C).

Next, the bag infeed conveyance unit 40 sequentially feeds the bags B to the first bag conveyance unit 10. In the first bag conveyance unit 10, the main conveyance unit 11 conveys the bags B. The second transfer unit 13 transfers the bags B to the retention unit 21 of the second bag conveyance unit 20. The retention unit 21 retains on the second conveyance surface 20a the bags B transferred by the second transfer unit 13. Because the shutter body 51 is in the second position, the bags B on the second conveyance surface 20a are inhibited from being moved downstream in the conveyance direction 20d and fed into the box C due to the effect of, for example, the vibration of the box packing apparatus 300.

As indicated by the dashed arrow in FIG. 6C, the retention unit 21 may perform a back-feed operation to convey the bags B in the opposite direction of the conveyance direction 20d. As a result of the retention unit 21 performing the back-feed operation, the bags B are inhibited from becoming unevenly retained in one place on the second conveyance surface 20a.

During the article retention process, the control unit 90 counts and stores, based on the detection signals of the second sensor 70, the number of the bags B being retained by the retention unit 21. The control unit 90 may end the box packing operation when the number of the bags B being retained by the retention unit 21 exceeds a predetermined number.

In step S160 the control unit 90 judges whether the box-replacement process has ended. The control unit 90 proceeds to step S170 when the box-replacement process has ended (YES). The control unit 90 proceeds to step S160 when the box-replacement process has not ended (NO). In other words, in step S160 the control unit 90 waits until the box-replacement process ends.

In step S170 the control unit 90 ends the article retention process, and then the control unit 90 proceeds to step S180. The main conveyance unit 11 of the first bag conveyance unit 10 is driven also during the second article feed process that is started next. For this reason, the control unit 90 need not stop driving the main conveyance unit 11 in step S170.

In step S180 the control unit 90 starts the second article feed process, and then the control unit 90 proceeds to step S190. The second article feed process is a process that causes the feed unit 22 to feed into the box C the bags B conveyed by the first bag conveyance unit 10 and the bags B retained by the retention unit 21 (see FIG. 6D). In the second article feed process, the control unit 90 drives the main conveyance unit 11 of the first bag conveyance unit 10, the retention unit 21 of the second bag conveyance unit 20, and the feed unit 22 of the second bag conveyance unit 20, changes the first transfer unit 12 to the second state, changes the second transfer unit 13 to the first state, and moves the shutter body 51 to the first position.

Next, the bag infeed conveyance unit 40 sequentially feeds the bags B to the first bag conveyance unit 10. In the first bag conveyance unit 10, the main conveyance unit 11 conveys the bags B. At this time, the second transfer unit 13 allows the bags B to be conveyed along the conveyance direction 11d because it is in the first state. The first transfer unit 12 transfers the bags B to the feed unit 22 of the second bag conveyance unit 20. At the same time, the retention unit 21 also transfers the bags B that were retained in the article retention process to the feed unit 22 of the second bag conveyance unit 20. The feed unit 22 conveys the bags B and feeds them from its downstream end portion into the box C that is in the box packing position 32. The downstream end portion of the feed unit 22 is reciprocated along the conveyance direction 20d above the box packing position 32 while the feed unit 22 feeds the bags B into the box C.

In step S190 the control unit 90 judges whether a number Nn2 of the bags B fed into the box C since the start of the second article feed process has reached a predetermined number Nf2. For the number Nn2, the control unit 90 uses, based on the detection signals of the second sensor 70, the sum of the number of the bags B that have transited the first transfer unit 12 and been fed into the box C and the number of bags B that had been retained by the retention unit 21 in the article retention process. The control unit 90 proceeds to step S200 when the number Nn2 becomes equal to or greater than the number Nf2 (YES). The control unit 90 proceeds to step S190 when the number Nn2 is less than the number Nf2 (NO). In other words, in step S190 the control unit 90 waits until the number Nn2 becomes equal to or greater than the number Nf2.

The number Nf2 may, for the same reason as that of the number Nf1, be the accommodation number N of the bags B to be packed in the box C or may be the number Nb smaller than the accommodation number N. The number Nf2 may be the same as or different from the number Nf1.

In step S200 the control unit 90 ends the second article feed process, and then the control unit 90 proceeds to step S140. Thus, the packing of one box C ends. The main conveyance unit 11 of the first bag conveyance unit 10 is driven also during the article retention process that is started next. For this reason, the control unit 90 need not stop driving the main conveyance unit 11 in step S200.

The box packing apparatus 300 can end the box packing operation when, for example, the packaging and box packing line 1 stops or when the supply of the bags B from the packaging machine 100 or the inspection apparatus 200 stops.

(4) Example Modifications (4-2) Example Modification B

In the box packing apparatus 300 pertaining to example modification B, the box conveyance unit 30 further includes a vibration unit 34.

The vibration unit 34 vibrates the box C that is positioned in the box packing position 32. The vibration unit 34 is disposed in the box packing position 32. The vibration unit 34 has a motor 34a, a crank mechanism 34b, and a table 34c. FIG. 7 is a side view showing the schematic configuration of the vibration unit 34.

The motor 34a is controlled by the control unit 90. The motor 34a may, for example, be a brushless motor.

The crank mechanism 34b converts rotational motion of the motor 34a to reciprocal motion of the table 34c between forwardly upward and rearwardly downward or reciprocal motion of the table 34c between rearwardly upward and forwardly downward.

The table 34c is a tabular member having an upper surface on which the box C is placed. A lower surface of the table 34c is connected to an arm of the crank mechanism 34b.

When the control unit 90 drives the motor 34a, the crank mechanism 34b reciprocally moves the box C in predetermined directions via the table 34c. Because of this, the box C on the table 34c vibrates.

In the box packing apparatus 300 pertaining to example modification B, the box C conveyed as far as the downstream end portion of the infeed conveyance unit 31 is transferred by a pusher to the upper surface of the table 34c of the vibration unit 34 disposed in the box packing position 32.

The control unit 90 of the box packing apparatus 300 pertaining to example modification B causes the vibration unit 34 to vibrate the box C in the first article feed process and the second article feed process of the box packing operation. Because of this, the bags B fed into the box C are spread out by vibration in the bottom portion of the box C. Consequently, according to the box packing apparatus 300 pertaining to example modification B, the bags B are inhibited from being unevenly packed inside the box C.

(4-3) Example Modification C

In the box packing operation of the box packing apparatus 300 pertaining to example modification C, the first bag conveyance unit 10 conveys, at a slower speed than the speed at which it conveys the bags B that are fed into a first box C (the box C that finishes being packed in step S130), the bags B that are fed into a second box C (the box C that finishes being packed in step S200) to which the bags B are fed after the first box C. Specifically, the conveyance speed of the main conveyance unit 11 in the article retention process is slower than the conveyance speed of the main conveyance unit 11 in the first article feed process and the second article feed process.

Because of this, inertia acting on the bags B conveyed by the main conveyance unit 11 in the article retention process is reduced over what it is in the first article feed process and the second article feed process. Consequently, according to the box packing apparatus 300 pertaining to example modification C, the bags B transferred from the main conveyance unit 11 to the retention unit 21 in the article retention process are inhibited from being mistakenly fed into the box C without being stopped by the retention unit 21.

Furthermore, because of this, time for the second transfer unit 13 to transfer the bags B to the second bag conveyance unit 20 in the article retention process is ensured, so according to the box packing apparatus 300 pertaining to example modification C, a reduction in packing efficiency is further inhibited.

(4-4) Example Modification D

The box packing apparatus 300 may include just either one of the right-side first bag conveyance unit 10R and the left-side first bag conveyance unit 10L.

(4-5) Example Modification E

The box packing apparatus 300 need not include the shutter unit 50.

(4-6) Example Modification F

The first transfer unit 12 and the second transfer unit 13 may, for example, be air jets, down conveyors, or pushers.

(4-7) Example Modification G

A case forming apparatus may supply the boxes C to the infeed conveyance unit 31 of the box conveyance unit 30. The case forming apparatus may also remove the boxes C from the outfeed conveyance unit 33 of the box conveyance unit 30 and seal the boxes C with tape or the like.

(4-8) Example Modification H

The second bag conveyance unit 20 of the box packing apparatus 300 need not have the feed unit 22. In this case, the first transfer unit 12 of the first bag conveyance unit 10 can directly feed the bags B into the box C disposed in the box packing position 32.

(4-9) Example Modification I

The feed unit 22 may be an inclined chute rather than a belt conveyor. In this case, the feed unit 22 has an inclined surface that slopes downward from back to front, and the bags B transferred from the first bag conveyance unit 10 and the retention unit 21 slide down the inclined surface and are fed into the box C.

REFERENCE SIGNS LIST

1 Packaging and Box Packing Line
10 First Bag Conveyance Unit (First Conveyance Unit)
10$d$ Conveyance Direction
10R Right-side First Bag Conveyance Unit (Right-side First Conveyance Unit)
10L Left-side First Bag Conveyance Unit (Left-side First Conveyance Unit)
11 Main Conveyance Unit
11$a$ First Conveyance Surface
12 First Transfer Unit
13 Second Transfer Unit
14 Third Transfer Unit
20 Second Bag Conveyance Unit (Second Conveyance Unit)
20$a$ Second Conveyance Surface
20$d$ Conveyance Direction
21 Retention Unit
22 Feed Unit
30 Box Conveyance Unit
34 Vibration Unit
40 Bag Infeed Conveyance Unit
50 Shutter Unit
60 First Sensor
70 Second Sensor
80 Third Sensor
90 Control Unit
100 Packaging Machine
200 Inspection Apparatus
300 Box Packing Apparatus
A Product
B Bags (Articles)
C Boxes
D Distance

CITATION LIST

Patent Literature

Patent Document 1: JP-U H6-3806

What is claimed is:
1. A box packing apparatus, comprising:
a first conveyance unit configured to convey articles; and
a second conveyance unit configured and arranged to convey the articles transferred from the first conveyance unit and to feed them into a succession of boxes waiting downstream, wherein the apparatus is configured such that when the second conveyance unit feeds a predetermined number of the articles into one of the succession of boxes, the second conveyance unit retains the articles transferred from the first conveyance unit without feeding them into said one of the succession of boxes;
wherein the first conveyance unit has a first transfer unit that transfers to the second conveyance unit the articles that are fed into a first box within said succession of boxes, and a second transfer unit that transfers to the second conveyance unit the articles that are fed into a second box within said succession of boxes and into which the articles are fed after the first box, and wherein the second transfer unit is disposed upstream of the first transfer unit in a conveyance direction of the first conveyance unit.

2. The box packing apparatus of claim 1, wherein the second conveyance unit is configured to perform a back-feed operation when it retains the articles transferred from the first conveyance unit.

3. The box packing apparatus of claim 1, wherein the first conveyance unit has a first conveyance surface upon which the articles can be placed and conveyed in a conveyance direction, the first conveyance unit comprises a left-side first conveyance unit and a right-side first conveyance unit disposed in such a way that their conveyance directions are parallel to each other with each of the left-side first conveyance unit and the right-side first conveyance unit having a respective first conveyance surface, the second conveyance unit is disposed between the left-side first conveyance unit and the right-side first conveyance unit, and the second conveyance unit has a second conveyance surface on which the articles can be placed and conveyed, the second conveyance surface being positioned vertically lower than the first conveyance surface of each of the left-side first conveyance unit and the right-side first conveyance unit.

4. The box packing apparatus of claim 1, wherein the second conveyance unit has a retention unit that retains the articles transferred from the first conveyance unit and a feed unit that feeds the articles into the box.

5. The box packing apparatus of claim 4, wherein the feed unit is a shuttle conveyor or a telescopic conveyor that can telescope along a conveyance direction of the first conveyance unit.

6. The box packing apparatus of claim 1, wherein the first conveyance unit conveys the articles that are fed into the second box at a slower speed than the speed at which the first conveyance unit conveys the articles that are fed into the first box.

7. The box packing apparatus of claim 1, further comprising a vibration unit configured to vibrate the box.

* * * * *